United States Patent [19]

Lockington

[11] Patent Number: 4,656,814
[45] Date of Patent: Apr. 14, 1987

[54] METHOD FOR JOINING SHEET MATERIALS

[75] Inventor: Philip G. Lockington, Middlesex, England

[73] Assignee: Laser Engineering (Development) Limited, London, England

[21] Appl. No.: 680,656

[22] Filed: Dec. 11, 1984

[30] Foreign Application Priority Data

Dec. 14, 1983 [GB] United Kingdom ............... 8333275

[51] Int. Cl.$^4$ ..................... B65B 9/02; B65B 51/22
[52] U.S. Cl. ................... 53/450; 53/DIG. 2; 156/215; 156/217; 156/272.4; 156/273.7; 156/273.9; 156/275.1; 156/298; 156/308.4; 156/309.6

[58] Field of Search ............... 156/69, 73.4, 157, 233, 156/272.2, 272.4, 273.3, 273.7, 273.9, 275.1–275.3, 297–298, 304.1–304.4, 304.6, 304.7, 308.2, 308.4, 309.6, 203, 215–218; 53/409, 450–452, 455–456, 459, 463, 204, DIG. 2, 373; 228/150–151; 220/80, 75, 81 R, 48 R, 48 T, 48 SB, 416–418, 450, 455, 468, 67; 428/347, 349

[56] References Cited

U.S. PATENT DOCUMENTS

| 2,647,072 | 7/1953 | Smith | 156/273.9 |
| 3,679,509 | 7/1972 | Fielibert | 156/69 |
| 4,030,960 | 6/1977 | Pratt | 156/582 |
| 4,097,324 | 6/1978 | Emmel | 156/51 |

*Primary Examiner*—Donald Czaja
*Assistant Examiner*—Merrell C. Cashion, Jr.
*Attorney, Agent, or Firm*—Young & Thompson

[57] ABSTRACT

A method of joining two sheets each comprising a metallic foil and heat-sealable material comprises applying heat and pressure to squeeze the heat-sealable material away from a region between the foils so as to provide electrical contact, either directly or by way of an inserted filament, between the foils.

3 Claims, 3 Drawing Figures

METHOD FOR JOINING SHEET MATERIALS

BACKGROUND TO THE INVENTION

The present invention relates to a method for joining sheet materials and in particular to a method of packaging an article employing that method.

Known packaging materials include a layer of aluminium foil which has on one side thereof a layer of heat sealable material such as, for example, SURLYN (Registered Trade Mark). In order to form a seal between the two edges of the material, two surface portions of the packaging material which have the heat sealable layer are brought into contact and heat sealed. It has been found that using that packaging material the seal formed by that known method provides adequate strength and is quite satisfactory for the exclusion of air, water and other extraneous materials. However, it does not provide a reliable shield against electro-magnetic fields.

SUMMARY OF THE INVENTION

The present invention relates to a method for joining sheet materials having heat-sealable material on an electrically conductive substrate so as to provide an electrical connection between the two sheet materials so joined.

The present invention provides a method of joining two face portions of sheet material comprising an electrically conductive substrate and a layer of heat sealable material, the method comprising the steps of applying pressure across and heating the two face portions thereby to squeeze the heat sealable material away from a region between the two substrates so as to enable electrical connection of the two substrates in that region and to seal together the two layers of heat-sealable material.

The present invention further provides a method of packaging an article comprising the steps of enclosing the article by one or more pieces of sheet material comprising an electrically conductive substrate and a layer of heat-sealable material so that adjacent pairs of face portions of sheet material have respective heat-sealable layers adjacent; holding the or each pair of face portions together so that the respective layers of heat sealable material are in contact and applying pressure across and heating the pair of face portions thereby to squeeze the heat-sealable material away from a region between the two substrates so as to enable electrical connection of the two substrates in that region either by direct contact of the substrates or by way of an inserted conductive element and to seal together the two contacting layers of heat sealable material.

Embodiments of the present invention will now be described by way of example with reference to the drawings.

DESCRIPTION OF THE PREFERRED EMBODIMENTS

Figure 1:
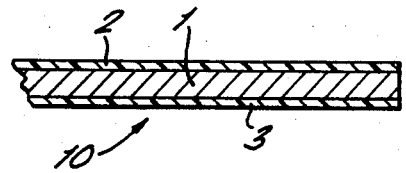
FIG. 1 shows a sheet material for use in the present invention.

Referring to FIG. 1, a sheet material 10 comprises a laminate comprising a layer of conductive metal foil 1, which may be composed of, for example, aluminium or copper, disposed on a layer of polyester film 2 and being attached thereto by means of a suitable adhesive. The polyester film 2 imparts a degree of tear resistance to the sheet material 10. On the other surface of the metal foil 1 is disposed a layer of heat-sealable film 3, which is attached to the metal foil 1 by means of a suitable adhesive. The heat sealable film 3 is preferably composed of an ionomer resin such as, for example, Surlyn (Registered Trade Mark) but alternative materials such as polyethylene may be employed. An advantage of Surlyn is that it has an affinity for aluminium foil (i.e. it spreads well over the foil) and for the purposes of the invention the Surlyn preferably has a thickness of around 12 microns.

Figure 2:
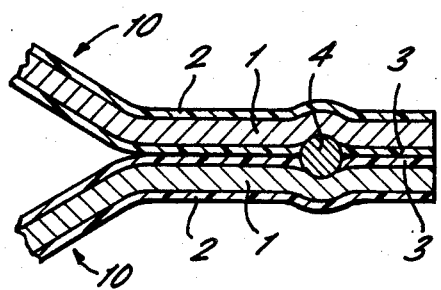
FIG. 2 shows a pair of the sheet materials of FIG. 1 which have been joined together in accordance with a first embodiment of the invention.

FIG. 2 shows two of the sheet materials 10 which have been joined together so as to connect electrically the two sheet materials 10. To join the sheet materials 10, two face portions of the sheet materials 10 are brought into contact with the two layers of heat-sealable film 3 being adjacent. Prior to the joint being made, between the two adjacent layers of heat-sealable film 3 and along the length of the joint to be made is disposed a filamentary element 4. More than one filamentary element 4 may be employed. The filamentary element 4 is a good conductor of electricity and preferably comprises copper wire, aluminium wire or a thin strip of "expanded" metal. The copper or aluminium wire preferably has a diameter of approximately 7 thousandths of an inch (i.e. 178 microns).

Figure 3:
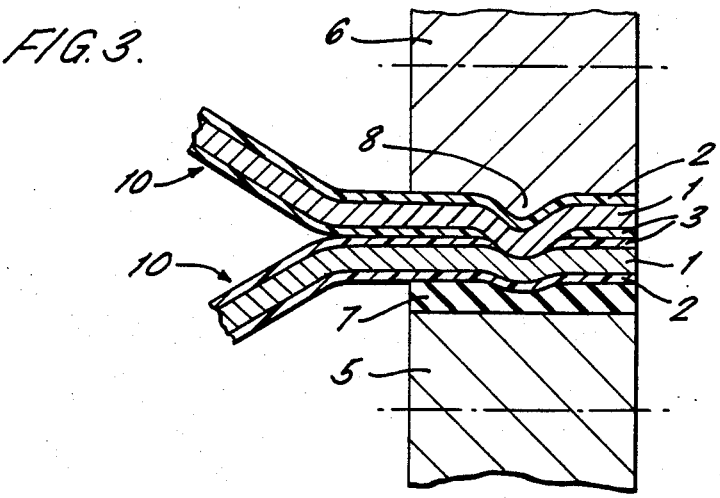
FIG. 3 shows the joining of sheet materials in accordance with a second embodiment of the invention.

To form a joint, heat and pressure are applied in any convenient manner, preferably including a pair of facing rollers such as the roller 5 in FIG. 3, to two sheets so that the two face portions are pushed together and surround the filamentary element 4. The heat-sealable layers 3 are heated to about 150°–200° C., the temperature being below the melting point of the heat-sealable material. The heat may be supplied as an impulse or continuously. The pressure applied causes the heat-sealable layers 3 to be squeezed together and sealed together. The filamentary element 4 squeezes respective portions of the heat-sealable layers 3 surrounding the filamentary element 4 away from the filamentary element 4 and the two metal foils 1 in a direction lateral of the applied pressure. The filamentary element 4 causes high local pressure to be developed at its surface so that it becomes urged against and in electrical contact with the two metal foils 1. When the joint is cooled and the pressure is removed, the joint is formed by the heat-sealable layers 3 and the filamentary element 4 which is surrounded by the joined layers 3. The heat-sealable layers 3 provide mechanical strength for the joint and the filamentary element provides a continuous electrical connection between the two metal foils 1 along the length of the joint.

FIG. 3 shows an alternative embodiment in which the two sheet materials 10 are joined by passing them through a pair of pressured rollers 5,6 which may be motor-driven. One of the rollers 5 has a cylindrical surface which is coated with a resilient layer 7. The other roller 6 has an annular ridge 8 disposed around a cylindrical surface thereof. The ridge 8 has a V-shaped section. More than one ridge 8 could be employed. To form the joint, the two face portions of the sheet materials 10 are brought into contact, with the two heat-sealable layers 3 being adjacent. The contacting portions are then passed through the rollers 5,6. Heat is applied to the contacting portions so as to raise the temperature of the heat-sealable layers in a manner similar to that used in the embodiment of FIG. 2. The rollers 5,6 may themselves be heated or alternatively a heater bar may be positioned between the rollers 5,6 and a pair of feed rollers (not shown) through which the strip materials 10 may be passed prior to heating and joining. The high temperature and pressure between the rollers 5,6 causes that sheet material 10 which is nearest the roller 5 to be deformed by the ridge 8 and urged towards the other sheet material 10. The ridge 8 forms an elongate V-shaped channel along the joint. The heat-sealable layers 3 are squeezed away from the deformed portion of the sheet material 10 so that the two metal foils are brought into electrical contact along the length of the joint. The heat-sealable layers 3 are sealed together. The resilient layer 7 tends to resist deformation of the other sheet material 10. The pressure profile across the roller surfaces is arranged to that the heat-sealable layers are only squeezed away from the vicinity of the ridge and are not squeezed out from the joint.

The present application has particular application in the packaging of electrical or electronic components which need to be shielded from the induction effects of radio-frequency electro-magnetic waves and infrared radiation. For such an application, the components need to be completely surrounded by the electrically conductive sheet material, with all joints in the sheet material providing a continuous low resistance electrical connection. In order to provide sufficient shielding, the metal foil 1 preferably has a thickness of not less than approximately 30 microns, so as to give sufficient electrical conductivity of the metal foil 1. The thickness of the metalfoil 1 is preferably of a value such that the sheet material is sufficiently flexible for its intended use. The present invention can provide a cheap, convenient and efficient means to provide such shielding, with the joints having high electrical and mechanical strength.

I claim:

1. In a method of packaging an article to provide a complete radio frequency shield thereabout, including enclosing the article with sheet material comprising an electrically conductive substrate and a layer of heat sealable material, and forming a continuous seam along overlapping portions of the sheet material; the improvement wherein forming said seam comprises:
   disposing an electrically conductive filamentary element between the sheet portions along the direction selected for said seam;
   heating said sheet portions at least in the region of said element; and
   squeezing the sheets together between a pair of resilient rollers with the layers of heat sealable material facing each other and in contact with said element to cause the heat sealable material on each of said sheets to be squeezed by contact with said element laterally away from said element and to urge the element into close electrical contact with both of the conductive substrates along the entire length of the seam.

2. A method according to claim 1 wherein the filamentary element is a wire.

3. A method according to claim 1 wherein the element comprises a narrow strip of expanded metal.

* * * * *